(12) United States Patent
Hubbert

(10) Patent No.: US 10,914,828 B2
(45) Date of Patent: Feb. 9, 2021

(54) REGRESSION FILTER FOR RADAR DATA

(71) Applicant: University Corporation for Atmospheric Research, Boulder, CO (US)

(72) Inventor: John Clark Hubbert, Fort Collins, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 222 days.

(21) Appl. No.: 16/227,239

(22) Filed: Dec. 20, 2018

(65) Prior Publication Data

US 2020/0200887 A1 Jun. 25, 2020

(51) Int. Cl.
*G01S 13/20* (2006.01)
*G06F 17/18* (2006.01)
*G01S 7/28* (2006.01)

(52) U.S. Cl.
CPC ............ *G01S 13/20* (2013.01); *G01S 7/2813* (2013.01); *G06F 17/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,592,171 A | * | 1/1997 | Jordan | G01S 13/581 342/26 D |
| 2008/0001808 A1 | * | 1/2008 | Passarelli, Jr. | G01S 13/5244 342/26 R |

OTHER PUBLICATIONS

Sebastian M. Torres et al, Ground Clutter Canceling with a Regression Filter, Journal of Atmospheric and Oceanic Technology, vol. 16, Oct. 1999, pp. 1364-1372, American Meteorological Society.
Sebastian Torres et al, Ground Clutter Canceling With a Regression Filter, National Severe Storms Laboratory Interim Report, Oct. 1998, 39 pages, NOAA, National Severe Storms Laboratory, Norman, Oklahoma.

* cited by examiner

*Primary Examiner* — Mamadou L Diallo
(74) *Attorney, Agent, or Firm* — The Ollila Law Group LLC

(57) ABSTRACT

A method and system for removing ground clutter data from time series data are provided. The method comprises receiving first time series data, dividing the first time series data into a plurality of subsets of first time series data, applying a first regression filter to each respective subset first time series data of the plurality of subsets of first time series data to generate a plurality of regression filtered subsets of first time series data, and concatenating the plurality of regression filtered subsets of first time series data to generate a regression filtered first time series data.

18 Claims, 11 Drawing Sheets

REGRESSION FILTER FOR RADAR DATA

GOVERNMENT LICENSE RIGHTS

This invention was made with Government support under awards 20140711 awarded by the National Oceanic and Atmospheric Administration. The United States Government has certain rights in this invention.

TECHNICAL FIELD

The present Application is directed towards a system for filtering radar data, and more particularly, to a regression filter for radar data.

BACKGROUND

Weather radar data is critical to providing weather prediction and transportation safety guidance. Echoes from ground clutter can contaminate weather radar data, however, making it difficult to identify some weather events.

Ground clutter echo can be caused by anything that doesn't move, or that moves slowly, that a radar beam may encounter. For example, parked cars, buildings, trees, trees swaying due to wind, towers, wires, terrain and power wires can cause ground clutter echo.

Errors caused by ground clutter echoes can cause air traffic controllers to needlessly reroute planes around non-existent storms, meteorologists to severely overestimate rainfall, and automated warning systems to generate erroneous flash flood alarms. Ground clutter echoes can further mask ongoing high-impact weather from detection, and generally confound the users of radar data.

Ground clutter echoes tend to have a narrow spectrum width in the Doppler spectrum of the radar echo compared with weather signals, with a mean Doppler velocity of zero. For example, FIG. 1 depicts an example of unfiltered clutter Doppler spectrum 100. The x-axis of unfiltered clutter Doppler spectrum 100 is the Doppler velocity in meters per second, and the y-axis represents the power in decibels. As may be seen in FIG. 1, there is a peak centered on 0 m/s, with a half power bandwidth width of approximately 0.25m/s. The peak represents the received power caused by the ground clutter echo that overlays a weather signal in Doppler spectrum 100. The central power spike of Doppler spectrum 100 slopes off to a lower continuum as the magnitude of the Doppler velocity increases. The continuum area is where weather data with significantly less power than the ground clutter is located. Thus, it may be seen that a high percentage of ground clutter echo may be reduced if the spectral components in a band centered at zero frequency, or zero Doppler velocity, are removed by a suitable high-pass filter.

Prior techniques to remove ground clutter from radar data have included a Doppler spectrum notch technique. The Doppler spectrum notch technique applies a notch filter to the Doppler spectrum of the radar echo to eliminate the part of the Doppler spectrum around zero velocity. By setting the values around zero velocity to zero, much of the ground clutter may be removed. The desired radar variables may then be calculated from the remaining part of the Doppler spectrum. Using a Doppler spectrum notch filter can remove low velocity weather data, however.

In order to eliminate as much ground clutter as possible, some prior methods have weighted the time series data generated from the clutter echo (with possible weather echo overlaid) using a window function such as a von Hann window or a Blackman window. These window functions tapper the endpoints of the time series to zero or near zero. When the time series signal is converted to the Doppler spectrum using the finite discrete time Fourier Transform, the ground clutter signal clusters more tightly around zero velocity, making it possible to eliminate more of the ground clutter signal with a spectrum notch filter.

One disadvantage to applying a window function to the time series data is that it attenuates the signal and eliminates some of the information provided by the weather signal that is present along with the ground clutter. This translates to higher measurement standard deviations for the weather signal. This disadvantage has previously been accepted as a necessary feature when using frequency domain (Doppler spectrum) ground clutter filters.

Another different technique for removing ground clutter signal includes applying a regression filter. One example of using a regression filter to remove ground clutter is provided by Tones, S. and D. Zrnic, 1999: Ground clutter canceling with a regression filter, J. Atmos. Oceanic Technol., 16, 1364-1372. Regression filters approximate their input signals with polynomial functions in the time domain and rely on the feature that the ground clutter echoes tend to vary slowly in time, whereas weather signals typically vary more rapidly in time. In order to remove the slowly varying ground clutter part of the signal from the time series data, a regression curve (i.e., a polynomial fit) is fitted to a radar time series that represents a radar resolution volume and then the fitted curve is subtracted from the signal, leaving the rapidly-varying weather signal in the residual data.

Fitting higher order polynomials to time series may not be viable because the polynomial may be badly conditioned, and more computation time is required for higher order polynomial fits. Therefore, although the regression filter technique has been investigated, it has not been deployed because of these problems resulted in inferior clutter elimination compared to the Doppler spectrum notch technique.

What is needed is a ground clutter echo filtering technique that removes adequate amounts of ground clutter from radar data, without affecting the underlying weather data and therefore increasing the standard deviation of the weather signal.

ASPECTS

A method for removing ground clutter data from time series data is provided. The method comprises receiving first time series data. The method further comprises dividing the first time series data into a plurality of subsets of first time series data. The method further comprises applying a first regression filter to each respective subset first time series data of the plurality of subsets of first time series data to generate a plurality of regression filtered subsets of first time series data. The method further comprises concatenating the plurality of regression filtered subsets of first time series data to generate a regression filtered first time series data.

A system for removing ground clutter data from time series data is provided. The system comprises a first data receiving module operable to receive first time series data. The system further comprises a first dividing module operable to divide the first time series data into a plurality of subsets of first time series data. The system further comprises a first filtering module operable to apply a first regression filter to each respective subset first time series data of the plurality of subsets of first time series data to generate a plurality of regression filtered subsets of first time series data. The system further comprises a first concatenation module operable to concatenate the plurality of regression filtered subsets of first time series data to generate a regression filtered first time series data.

BRIEF DESCRIPTION OF THE DRAWINGS

The same reference number represents the same element on all drawings. The drawings are not necessarily to scale.

DETAILED DESCRIPTION

FIGS. 1-11 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

Figure 1:
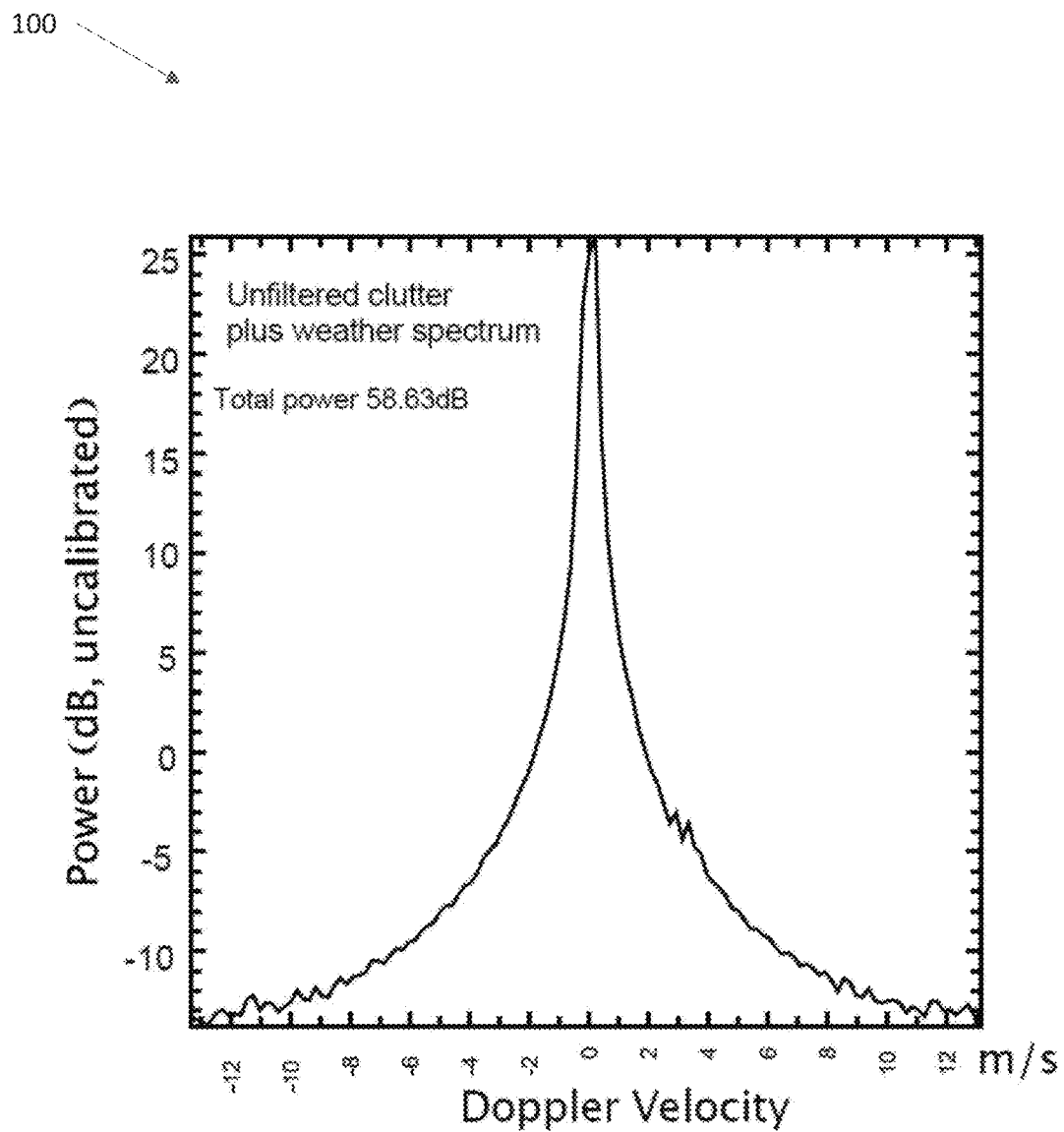
FIG. 1 depicts unfiltered clutter Doppler spectrum 100.
Figure 2:
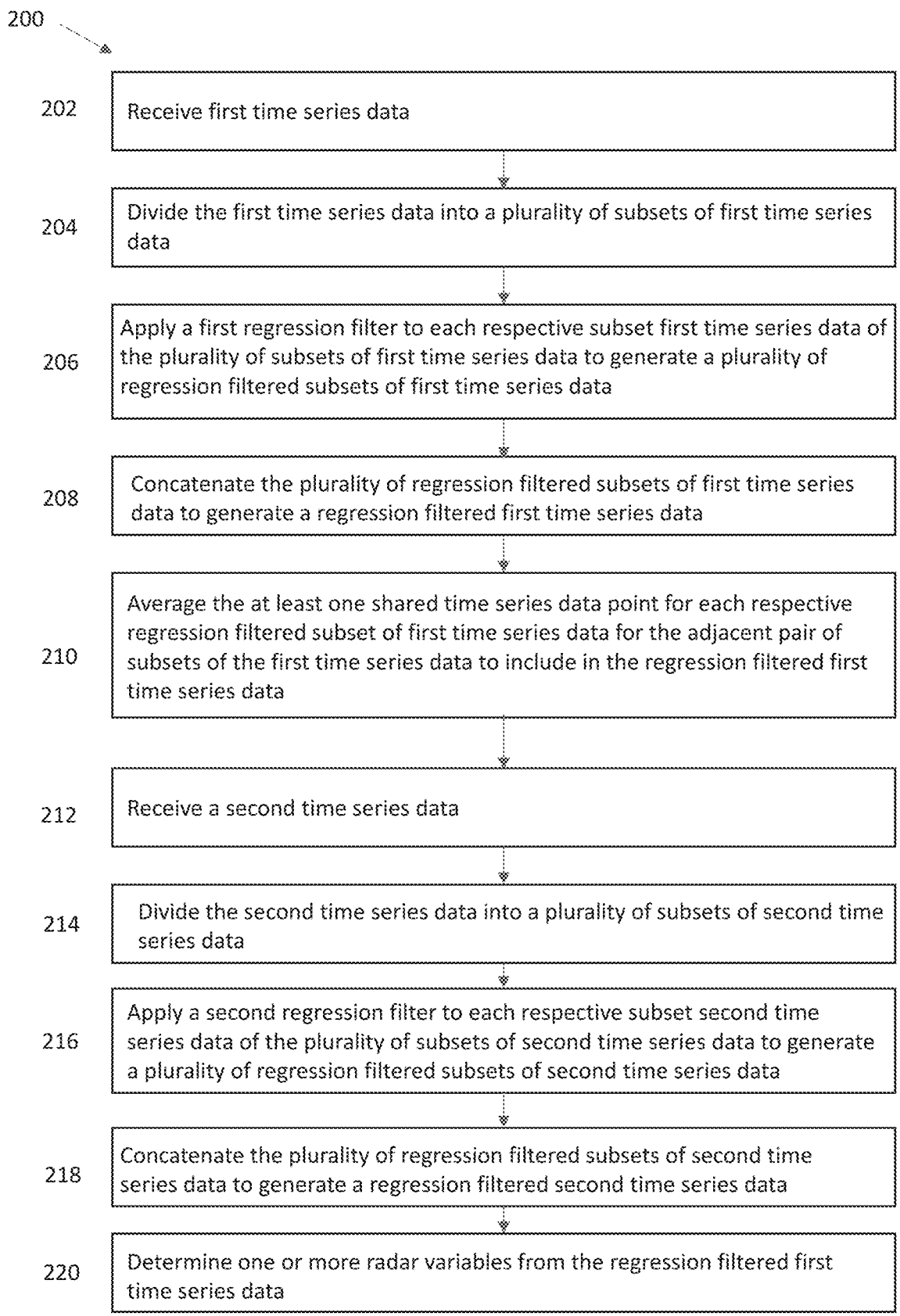
FIG. 2 depicts method 200, in accordance with an embodiment.

FIG. 2 depicts method 200, in accordance with an embodiment. Method 200 may be used to remove ground clutter from radar time series data. Method 200 begins with step 202. In step 202, first time series data is received.

Radars typically conduct a raster scan by performing a first azimuthal scan, increasing or decreasing the elevation angle by 0.5-1.5 degrees, and performing a subsequent azimuthal scan. In further embodiments, however, a first elevation scan may be performed, then the azimuth may be adjusted, and a subsequent elevation scan may be performed.

At each radar antenna pointing direction in a scan, a radar transmits individual pulses and samples the return signal in time, which corresponds to a distance or range from the radar. Consecutive N samples at a particular range define a radar resolution volume. In this way, a series of resolution volumes over a radial range of depths along the pointing direction of the radar are defined. A typical pencil beam radar may have a 1-degree half power beam width, defining a radial cone, at a fixed azimuth and elevation, over a range of distances from the radar. The typical depth for a radar resolution volume is from 150 meters to 2.5 km. The N samples for a particular radar resolution volume comprise the time series data for that resolution volume. Thus, for each sample time after the radar pulse, a series of time series is constructed for each resolution volume along the radial range from the radar.

For a Doppler radar, the time series data include a real part and an imaginary part, also referred to as the in phase and quadrature parts, or the I and Q parts. These data are used to calculate, for example, the power of the signal, and the Doppler velocity of the signal. The real parts and the imaginary parts may be determined from using a quadrature demodulator, or any other method known to those of skill in the art.

Figure 3A:
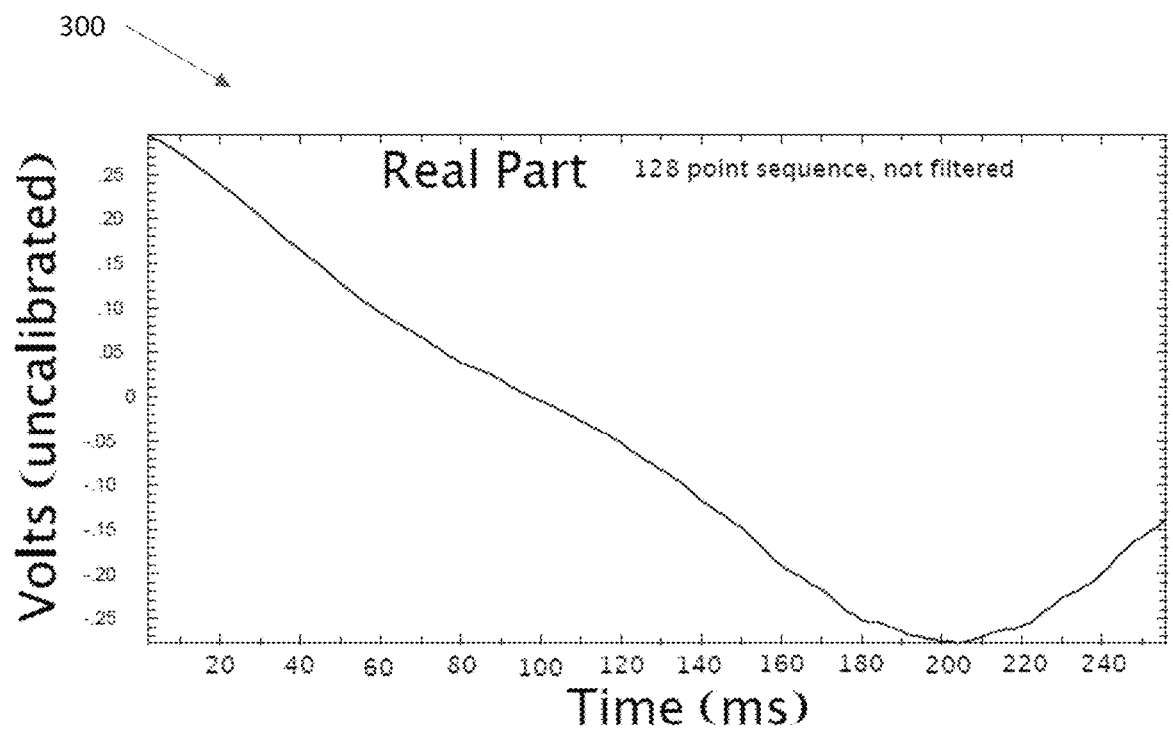
FIG. 3A depicts time series data 300, in accordance with an embodiment.
Figure 3B:
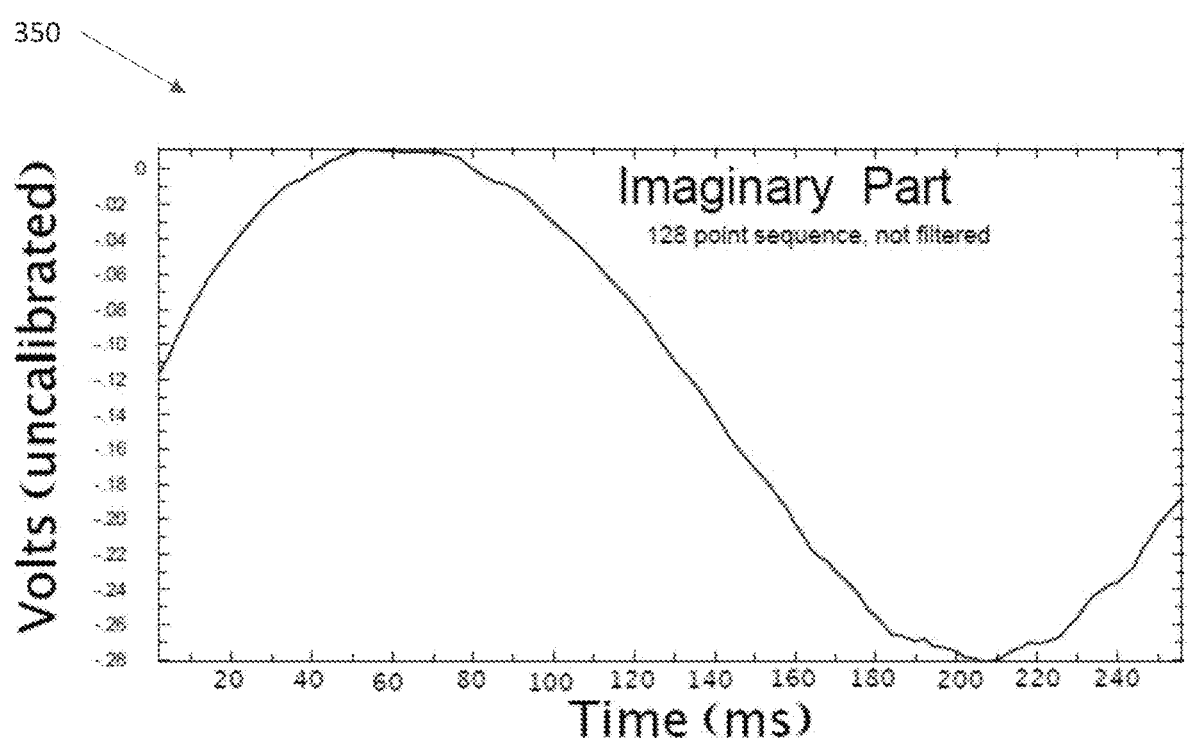
FIG. 3B depicts time series data 350, in accordance with an embodiment.

FIG. 3A depicts an example first time series data 300, which corresponds to the real part of a raw radar time series data, and FIG. 3B depicts an example first time series data 350, which corresponds to the imaginary part of a raw radar time series data. First time series data 300 and 350 correspond to the unfiltered Doppler spectrum 100 which shows a large clutter signal overlaid onto a weak weather signal. The x-axis of real time series data 300 and imaginary time series data 350 represent the time in milliseconds over which the time series are gathered, while the y-axis represents the voltage recorded at the receiver.

As may be seen in first time series data 300 and 350, both plots show a relatively slow-changing features on a timescale of 1 to 256 ms. These slow-changing features generally correlate to ground clutter signal. Smaller variations over shorter time periods can be seen on top of the slow varying part. Thus, the first time series data 300 and 350 each further include more rapidly changing features on a timescale of a few ms, that generally correspond to weather signal and/or noise.

Method 200 continues with step 204. In step 204, the first time series data is divided into a plurality of subsets of first time series data. A subset of first time series data is shorter than the full length of the first time series data.

Figure 4:
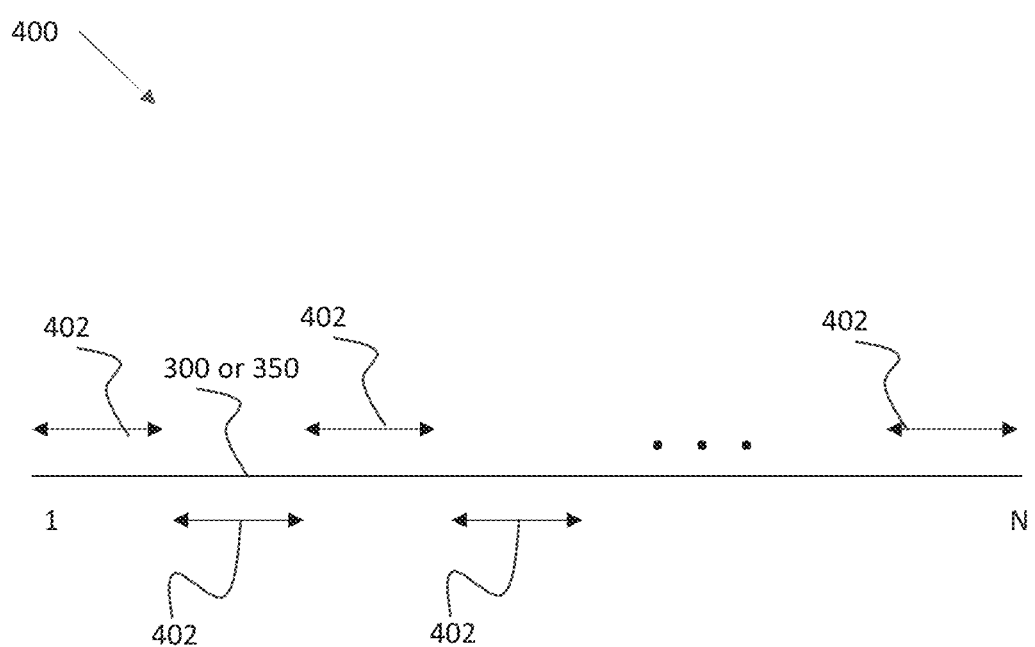
FIG. 4 depicts time series data dividing scheme 400, in accordance with an embodiment.

For example, FIG. 4 depicts time series data dividing scheme 400. Dividing scheme 400 includes plurality of subsets of first time series data 402 and first time series data 300 or 350. Subsets 402 divide up first time series data 300, 350, which is indexed from 1 to N.

Method 200 continues with step 206. In step 206, a first regression filter is applied to each respective subset first time series data of the plurality of subsets of first time series data to generate a plurality of regression filtered subsets of first time series data.

A regression filter is a high-pass filter that approximates an input signal with polynomial functions in the time domain. Because the ground clutter signal varies slowly compared to the weather echo signal in the time series data, the ground clutter signal may in some circumstances be approximated with a polynomial of a lower degree than that which would be required of the weather echo signal.

The polynomial fit may be performed by projecting the input signal samples V(t), t ∈ {$t_m$} onto the subspace W spanned by a basis B consisting of p+1 orthonormal polynomials. This set of polynomials may be given by B={$b_0(t)$, $b_1(t)$, $b_2(t)$, . . . , $b_p(t)$}, where each $b_i(t)(0 \le i \le p)$ is a polynomial of ith degree; that is, $b_i(t)=c_{0i}+c_{1i}t+ \ldots +c_{ii}t^i$. Then, the projection $\hat{V}(t)$ (i.e., the clutter signal) may be obtained by constructing a linear combination of the elements of the basis B, that is, the implication is that $\hat{V}(t)$ is in W, as given by Equation 1:

$$\hat{V}(t_m) = \Sigma_{i=0}^{p} \alpha_i b_i(t_m) \quad \text{(Equation 1)}$$

The residue $V_f(t_m)=V(t_m)-\hat{V}(t_m)$ may therefore be associated with the portion of the input signal that is not contained in the clutter subspace W [i.e., it is orthogonal to $\hat{V}(t)$]. The $\alpha_i$ coefficients are computed using the formula provided by Equation 2;

$$\alpha_i = \frac{(V, b_i)}{\|b_i\|^2} = \frac{\sum_{m=0}^{M-1} V(t_m) b_i(t_m)}{\sum_{m=0}^{M-1} b_i^2(t_m)} \quad i = 0, 1, \ldots, p, \quad \text{(Equation 2)}$$

where V and $b_i$ are vectors of the sampled input signal and the $b_i(t)$ polynomials, respectively.

Generalization in this analysis is not lost if each element of B is normalized such that $\|b_i\|=1$, where $\|b_i\|^2=(b_i, b_i)$. In addition, to simplify the notation the basis matrix B and the coefficient vector A may be defined as given in Equations 3 below:

$$B = \begin{bmatrix} b_0(t_0) & b_0(t_1) & \ldots & b_0(t_{M-1}) \\ b_1(t_0) & b_1(t_1) & \ldots & b_1(t_{M-1}) \\ \vdots & \vdots & \ddots & \vdots \\ b_p(t_0) & b_p(t_1) & \ldots & b_p(t_{M-1}) \end{bmatrix} \text{ and } A = \begin{bmatrix} \alpha_0 \\ \alpha_1 \\ \vdots \\ \alpha_p \end{bmatrix} \quad \text{(Equations 3)}$$

Then, assuming a normalized base, Eqs. (1) and (2) can be rewritten as $\hat{V}=B^T A$ and A=BV, respectively. Substitution of Equation 2 into Equation 1 produces $\hat{V}=B^T BV$. The residue or filtered signal $V_f$ may therefore be expressed according to Equation 4:

$$V_f = V - \hat{V} = (I - B^T B)V = FV \quad \text{(Equation 4)}$$

Where I is the identity matrix and the regression filter matrix is defined by Equation 5:

$$F = I - B^T B \quad \text{(Equation 5)}$$

In embodiments, the regression filter may be linear and time varying.

In the embodiment described above, the polynomial functions utilized by the regression filter comprise orthogonal polynomial functions. This is not intended to be limiting, however. As those in the art will readily understand, in further examples, the regression filter may comprise any type of orthogonal polynomial functions known to those of skill. For example, the regression filter may comprise Legendre polynomials.

In examples, the polynomial fit may be performed using least squares methods or, any other method of fitting an equation to data known to those of skill in the art.

Figure 5A:
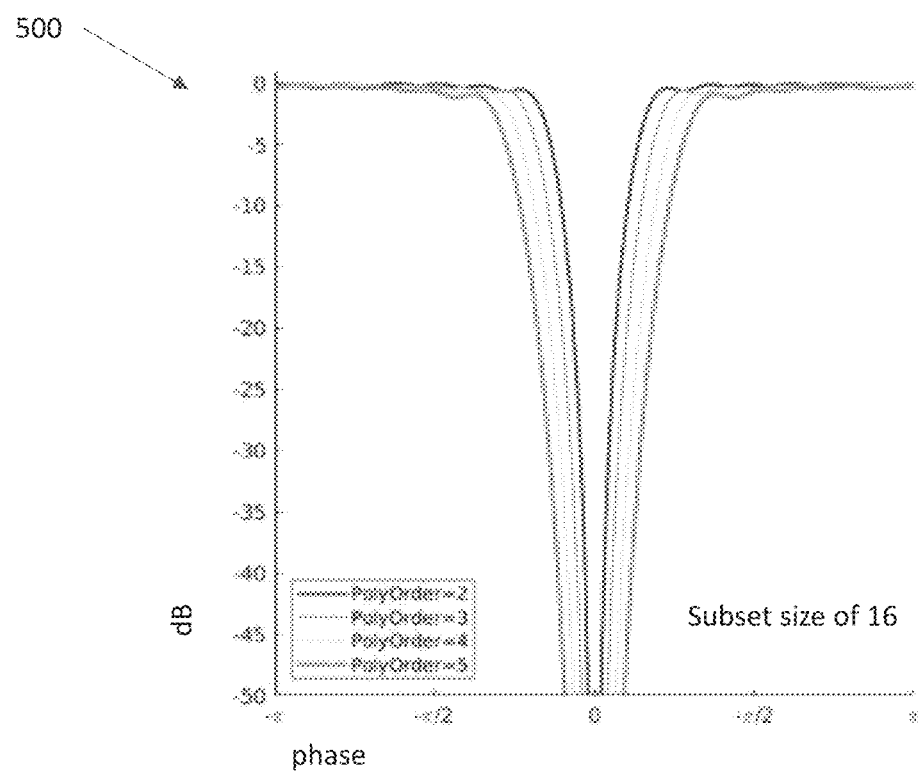
FIG. 5A depicts frequency response 500, in accordance with an embodiment.
Figure 5B:
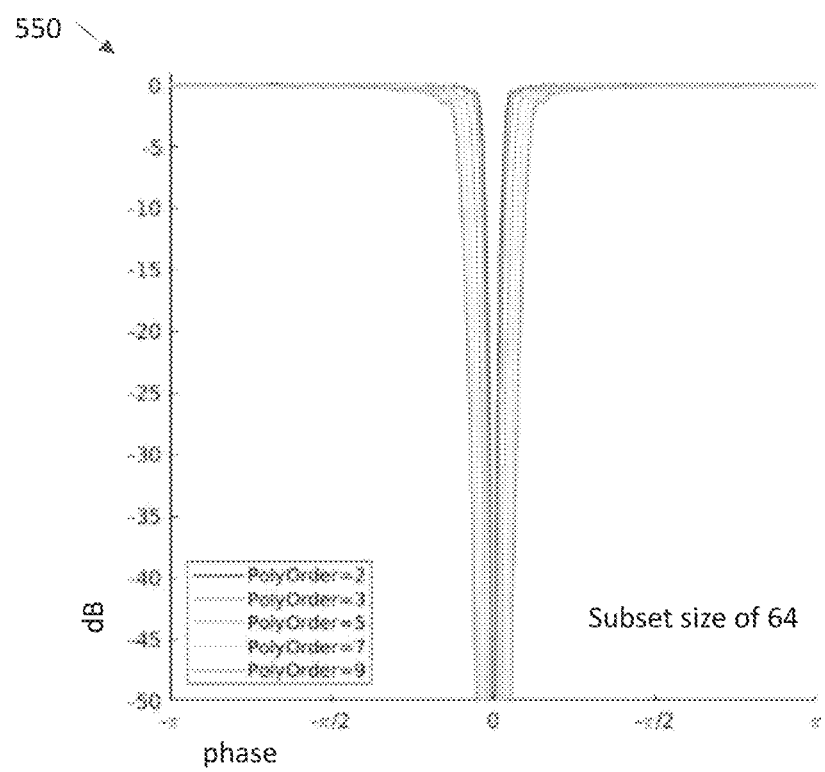
FIG. 5B depicts frequency response 550, in accordance with an embodiment.

FIGS. 5A and 5B depict example frequency responses 500 and 550 for first regression filter. Frequency response 500 shows the frequency response for a subset size of 16 using polynomial orders of 2-5, and frequency response 550 shows for a subset size of 64 using polynomial orders of 2-5. As may be seen from the figures, the notch size of the frequency response increases as the subset length decreases, and the notch size also increases as the polynomial order increases.

Because regression filter matrix F depends only on polynomial order p and subset size M, in embodiments regression filter matrix F may be precomputed to achieve a specific notch width for a specific sampling scheme. For a specific notch width and/or sampling scheme, regression matrix F may then be used in real-time applications without being recomputed.

Before method 200 continues with step 208, regression filter F is applied to each respective subset first time series data of the plurality of subsets of first time series data to generate a plurality of regression filtered subsets of first time series data. In step 208, the plurality of regression filtered subsets of first time series data are then concatenated to generate a regression filtered first time series data. For example, each respective sequential subset of the first time series data may be appended to the prior subset to generate the regression filtered first time series data. The regression filter first time series includes the residual first time series data, without the ground clutter signal.

Because the ground clutter signal varies slowly compared to the weather echo signal, in embodiments the ground clutter signal may be approximated with a polynomial of a relatively low degree compared to the faster-varying weather data. Moreover, by dividing the time series data into subsets and applying the regression filter to those subsets individually, it is possible to achieve a well-conditioned polynomial fit with the regression filter, making the regression filter technique computationally viable.

Figure 6A:
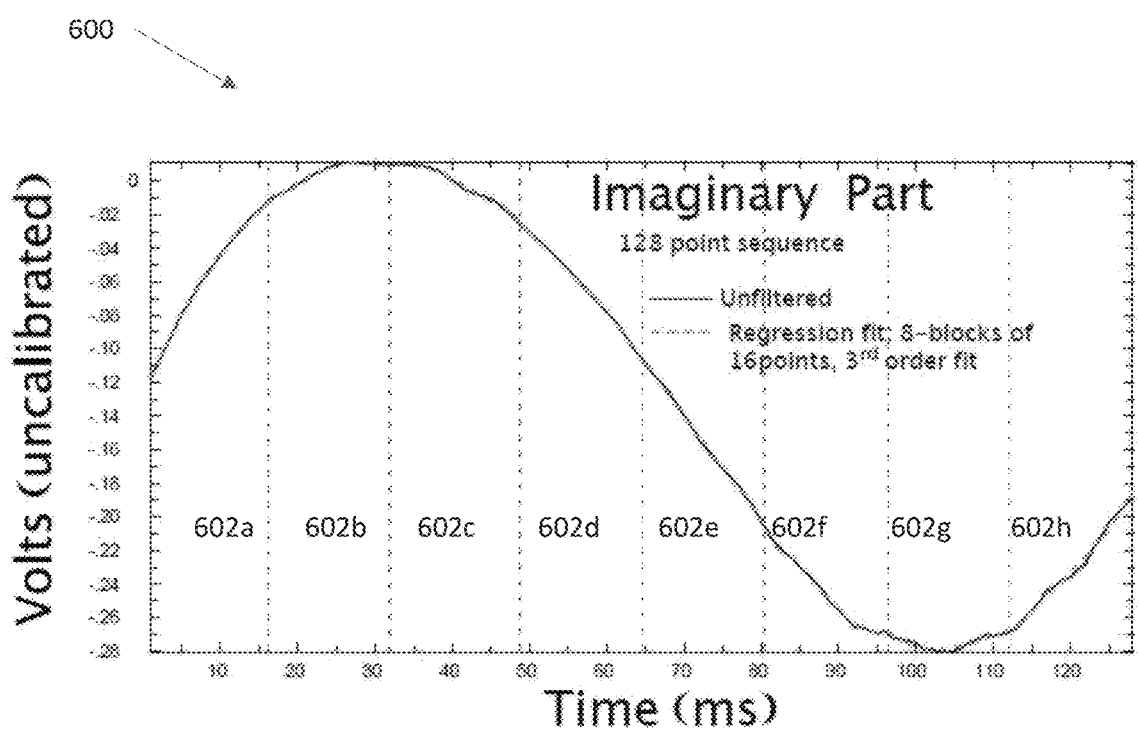
FIG. 6A depicts overlay plots 600, in accordance with an embodiment.
Figure 6B:
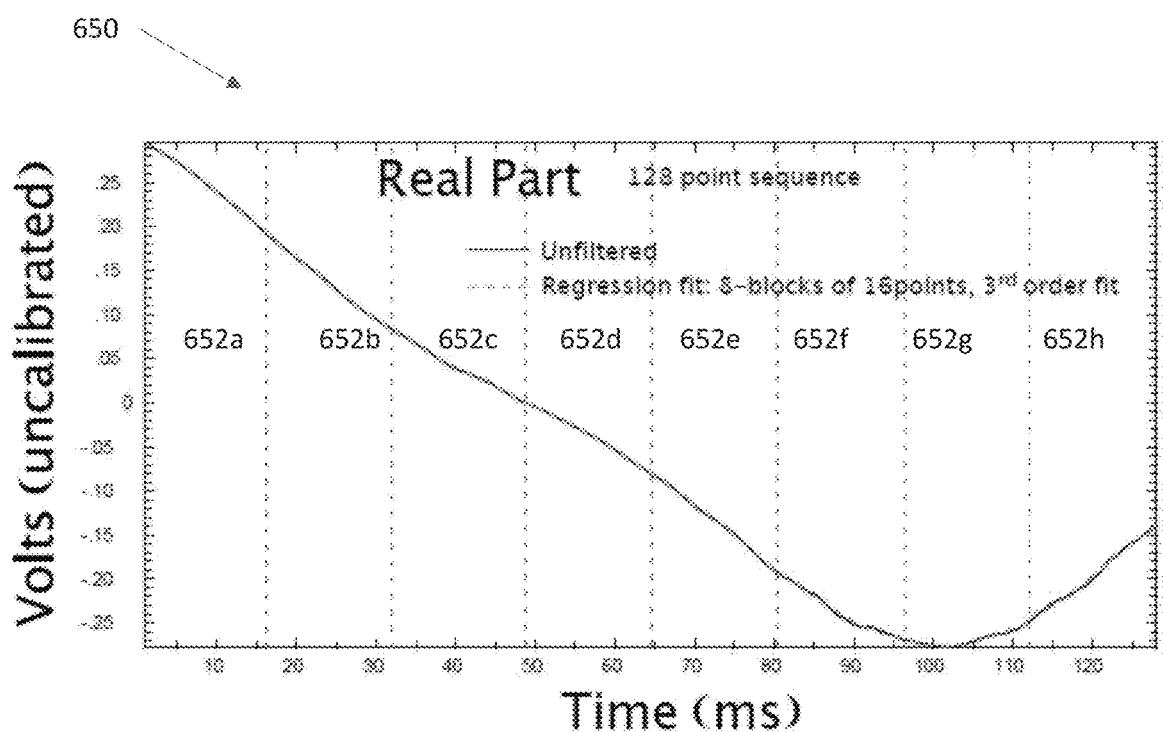
FIG. 6B depicts overlay plots 650, in accordance with an embodiment.

For example, FIGS. 6A and 6B depict overlay plots 600 and 650. Plots 600 and 650 include first time series data 300 and 350. In FIGS. 6A and 6B, each of first time series data 300 and 350 is divided into 8 subsets 602a-602h and 652a-652h, respectively. In the example, first time series data 300, 350 includes 128 points, and each of the 8 subsets has a length of 16 samples.

The first regression filter is then applied to each respective subset first time series data of the plurality of subsets of first time series data, and the concatenated to generate regression filtered first time series data. The regression fit curve generated by the first regression filter is represented in FIGS. 6A and 6B by the dotted line overlaying first time series data 300 and 350. In the example, the first regression filter is a third order regression fit. As may be seen, the regression filtered first time series data follows the slow-varying trends of first time series data 300, 350 very well.

Figure 7A:
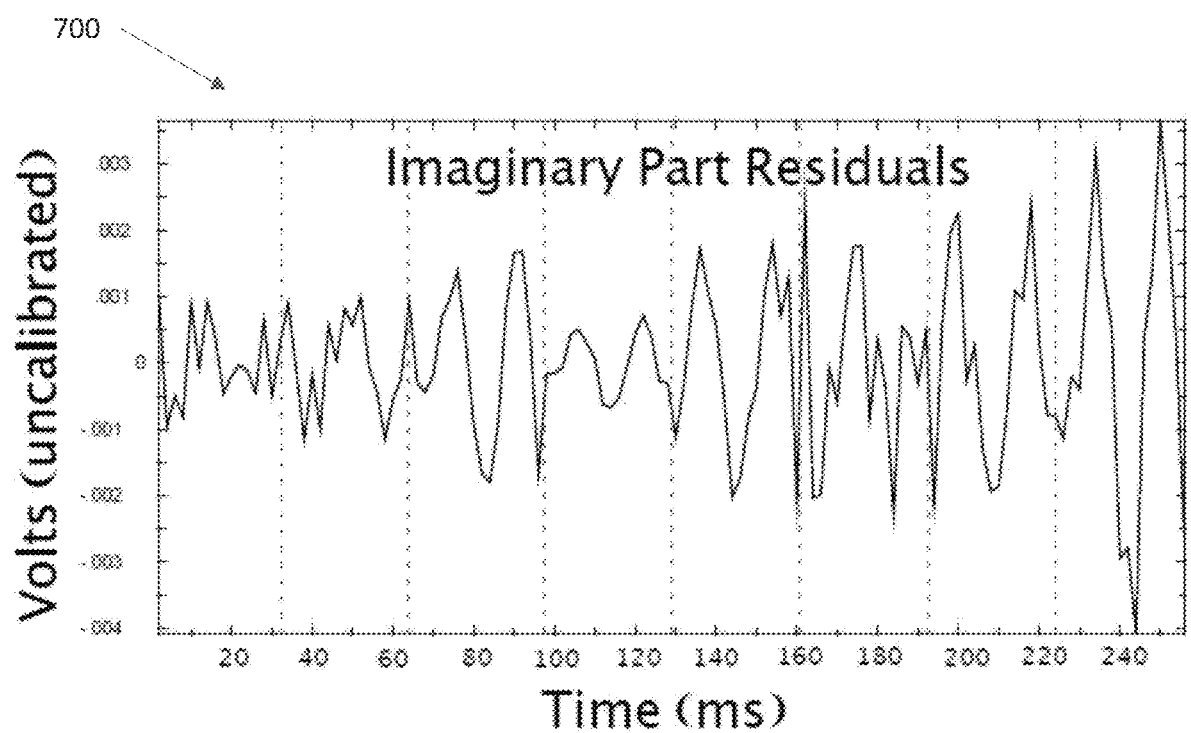
FIG. 7A depicts regression filtered first time series data 700, in accordance with an embodiment.
Figure 7B:
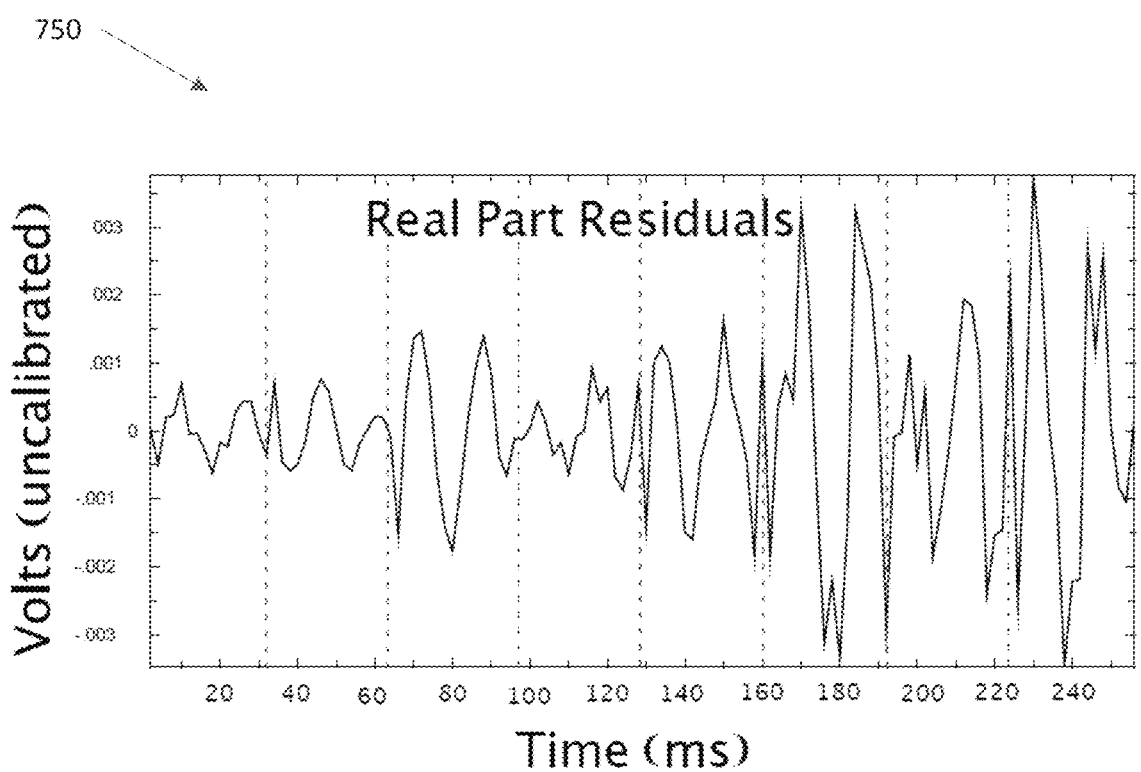
FIG. 7B depicts regression filtered first time series data 750, in accordance with an embodiment.

FIGS. 7A and 7B depict regression filtered first time series data 700 and 750. Regression filtered first time series data 700 and 750 represent the residuals when the regression fit curve generated by the first regression filter is subtracted from first time series data 300 and 350. Regression filtered first time series data 700 and 750 include the weather data and noise from time series data 300 and 350, without the ground clutter echo. As may be seen, regression filtered first time series data 700 and 750 preserves the highly variable features of time series data 300, 350, which are typically associated with weather events.

Figure 8A:
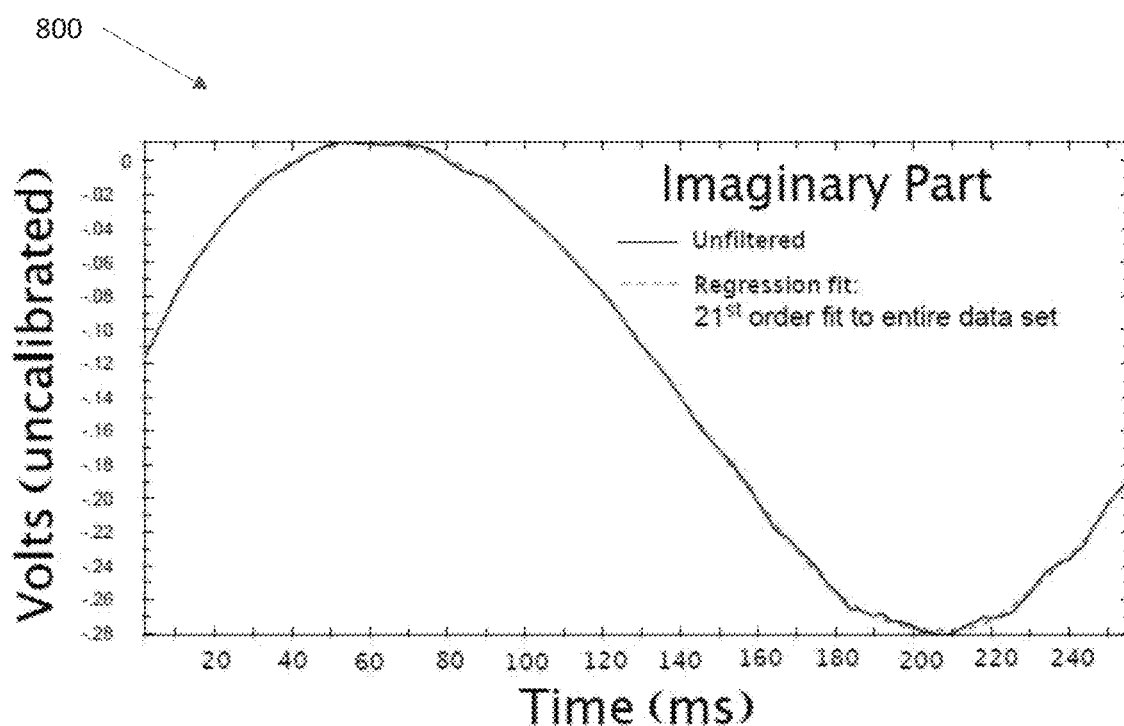
FIG. 8A depicts overlay plot 800, in accordance with an embodiment.
Figure 8B:
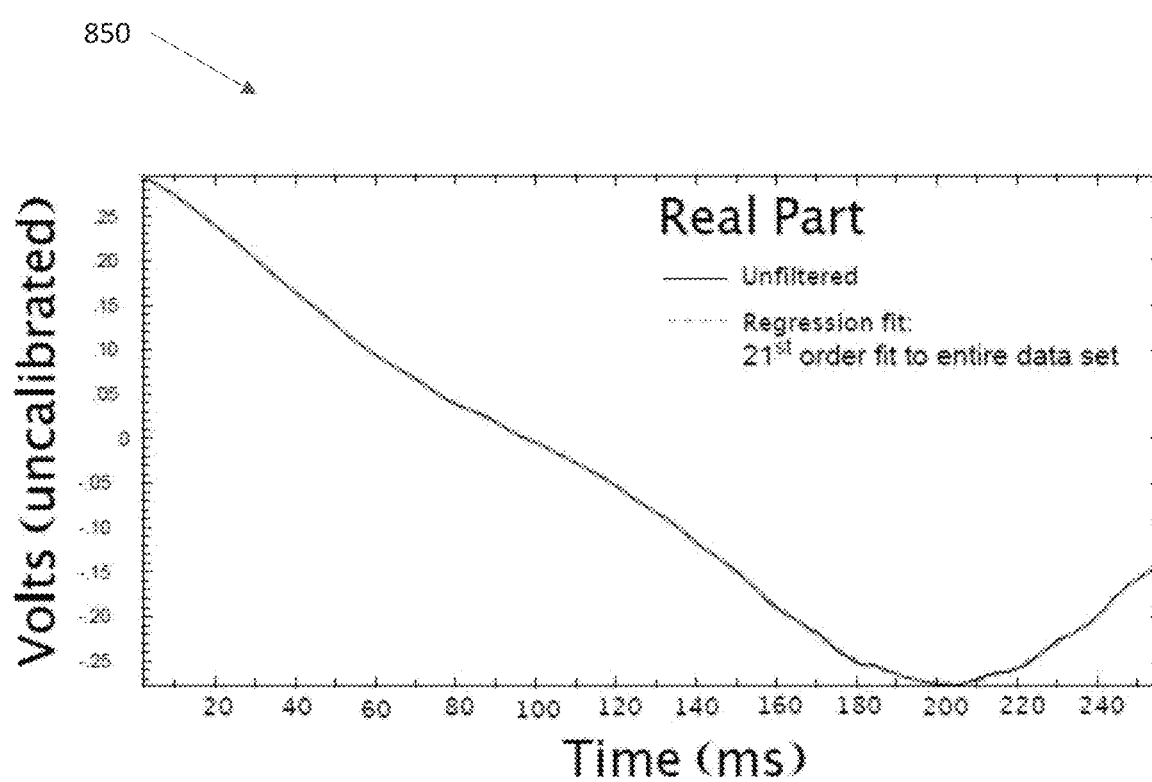
FIG. 8B depicts overlay plot 850, in accordance with an embodiment.

FIGS. 8A and 8B depict overlay plots 800 and 850. Overlay plots 800 and 850 include first time series data 300 and 350 with a 21th order polynomial fit, represented by the dotted line. In overlay plots 800, 850, the regression filter was applied to an undivided time series data 300, 350, which in the example includes a full size of 128 samples.

As may be seen, the $21^{th}$ order polynomial fit to a time series data with a length of 128 is are comparable to the $3^{rd}$ order polynomial fit to the plurality of subsets of first time series data with a size of 8 depicted in FIGS. 6A and 6B. However, fitting a polynomial with an order greater than 20 is typically badly conditioned. Advantageously, by dividing the time series data 300 and 350 into subsets 602a-602h and 652a-652h for filtering, it is possible to get improved performance with a much lower order polynomial.

Figure 9A:
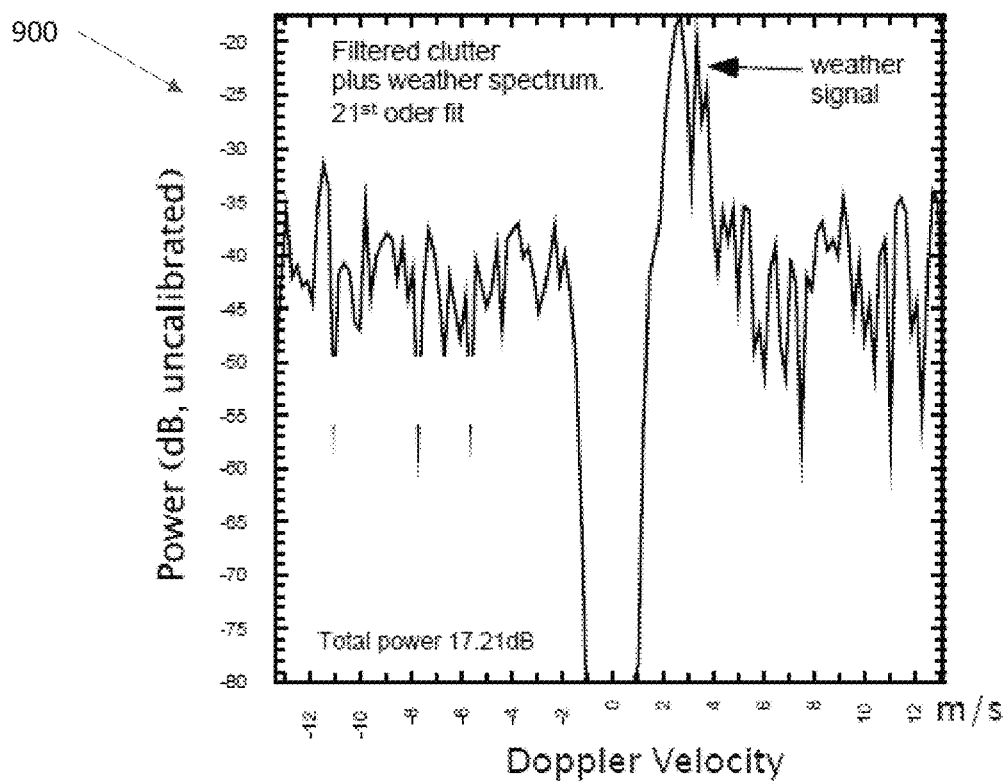
FIG. 9A depicts regression filtered first time series data in the Doppler spectrum 900, in accordance with an embodiment.
Figure 9B:
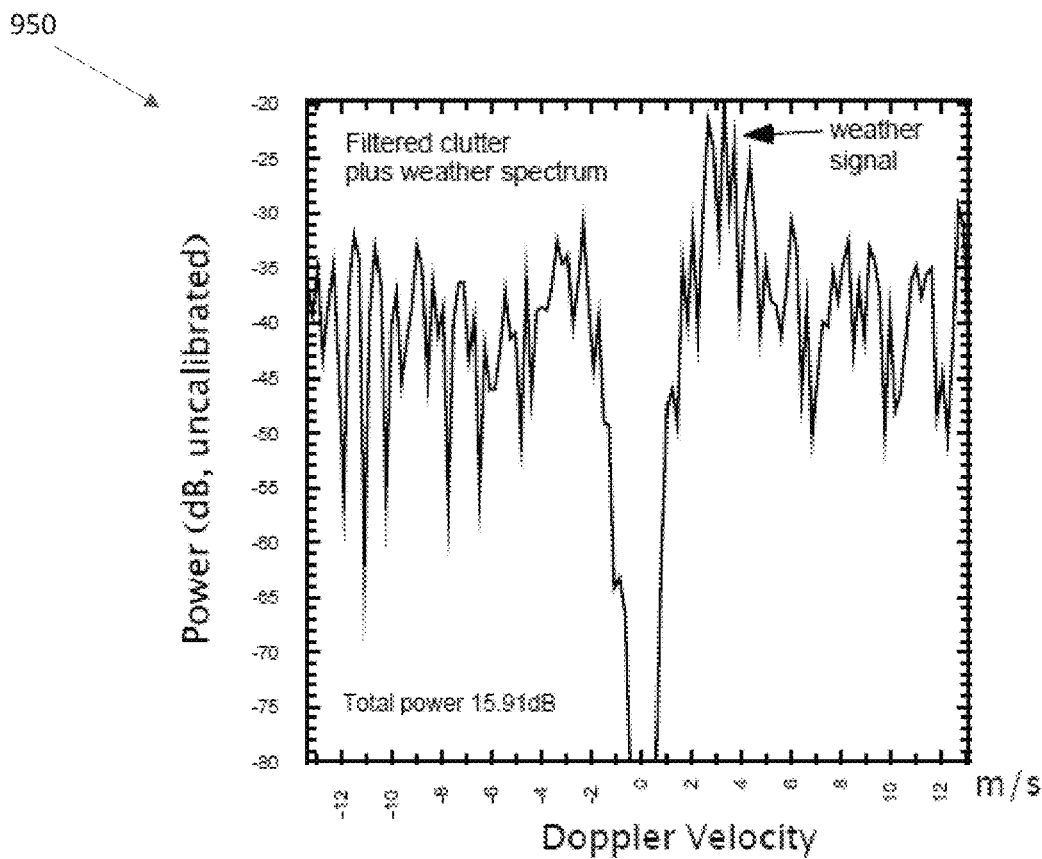
FIG. 9B depicts regression filtered first time series data in the Doppler spectrum 950, in accordance with an embodiment.

FIGS. 9A and 9B depict regression filtered first time series data in the Doppler spectrum 900 and 950. Regression filtered first time series data 900 corresponds to applying the first regression filter to the entire 128 sample first time series data 300, 350 with a $21^{th}$ order polynomial fit, while regression filtered first time series data 950 corresponds to applying the first regression filter to a 8 sample subset of the first time series data 300, 350 with a $3^{rd}$ order polynomial fit. The figures demonstrate the equivalence of a subset filtering approach to using a large order polynomial fitted to the entire data set.

In embodiments, each respective subset of the first time series data of the plurality of subsets of first time series data may be a single subset size. For example, subsets 602a-602h and 652a-652h of FIGS. 6A and 6B all have a length of 16 samples.

In embodiments, no two respective subsets of the first time series data of the plurality of subsets of first time series data may include a shared time series data point. For example, as may be seen in FIG. 4, no two of the subsets of the first time series data 402 overlap and include the same sample points of first time series data 300, 350.

In further embodiments, however, each adjacent pair of subsets of the first time series data of the plurality of subsets of first time series data may include at least one shared time series data point that other subsets of the plurality of subsets of the first time series do not include.

Figure 10:
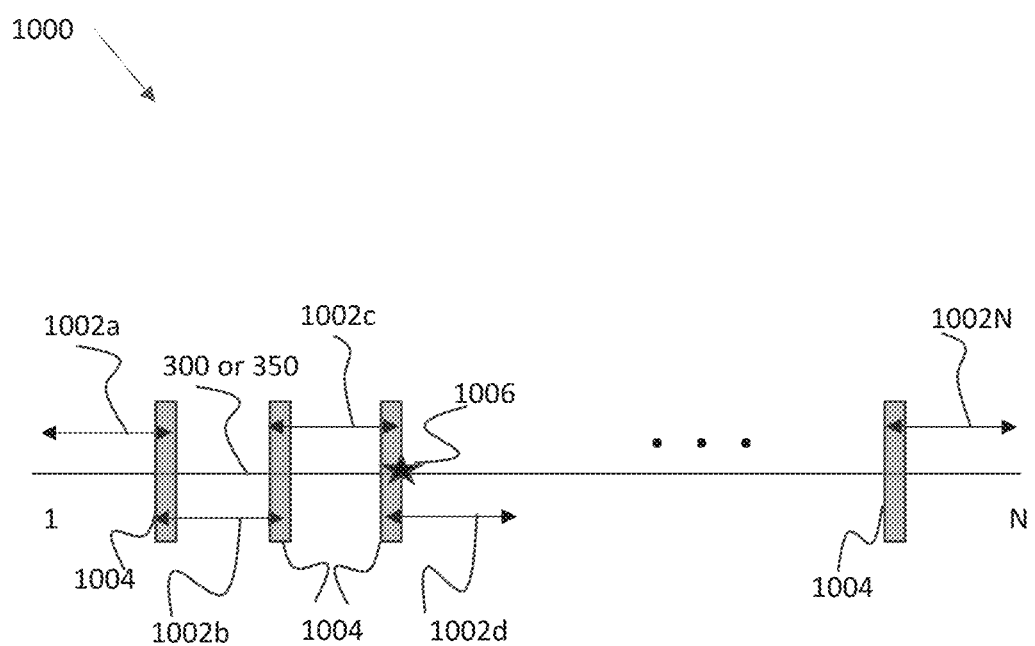
FIG. 10 depicts time series data dividing scheme 1000, in accordance with an embodiment.

For example, FIG. 10 depicts time series data dividing scheme 1000. Dividing scheme 1000 includes first time series data 300, 350, subsets 1002a-1002N, and overlapping regions 1004. Overlapping regions 1004 contain time series data points that are included, or shared, between adjacent subsets of time series data 300, 350. Shared time series data point 1006 is included in an overlapping region 1004a shared by adjacent subsets 1002c and 1002d. No other subsets of first time series data 300, 350 include shared time series data point 1006. By providing the overlapping regions 1004, it may be possible to provide even further improvements in ground clutter filtering performance and signal statistics of the weather echo variables over dividing scheme 400.

In examples, method 200 may further comprise step 210. In step 210, the at least one shared time series data point may be averaged for each respective regression filtered subset of first time series data for the adjacent pair of subsets of the first time series data to include in the regression filtered first time series data.

In FIG. 10, for example, shared time series data point 1006 is included in subsets 1002c and 1002d, when regression filtered subsets 1002c and 1002d are concatenated, the respective values of shared time series data point 1006 may be included only once, with the values from each of regression filtered subsets 1002c and 1002d averaged together in the regression filtered first time series data 700, 750. In embodiments, step 210 may be applied before or after step 208, as will be understood by those of skill.

Ground clutter echo tends to be strongest at the lowest elevation angle, with the signal weakening at increasing elevation angles. Ground clutter can also appear due to the radar's antenna pattern sidelobes. Therefore, in further embodiments method 200 may further include steps 212-218.

In step 212, a second time series data may be received. Second time series data is much like first time series data described above with respect to step 202, except that second time series data captures data for a different resolution volume than first time series data.

In step 214, the second time series data may be divided into a plurality of subsets of second time series data. Step 214 is similar to step 204, as described above.

In step 216, a second regression filter may be applied to each respective subset second time series data of the plurality of subsets of second time series data to generate a plurality of regression filtered subsets of second time series data. Step 216 is similar to step 206, as described above.

In step 218, the plurality of regression filtered subsets of first time series data may be concatenated to generate a regression filtered second time series data. Step 218 is similar to step 208, as described above.

In embodiments, the first time series data may correspond to a first elevation angle and second time series data may correspond to a second elevation angle, the first regression filter having a first regression filter length, and second regression filter having a second regression filter length that is less than the first regression filter length. The first regression filter length is the order of the polynomial of the first regression filter, and the second regression filter length is the order of the polynomial of the second regression filter. Advantageously, this may help adjust the frequency response of the regression filter to account for the different levels of ground clutter echo signal found in radar time series data at different elevations. By maintaining a greater first regression filter length for the lower first elevation, the first regression filter may remove more of the ground echo from data more aggressively than the higher second elevation, where the second regression filter length will be lower, reflecting the application of a lower order polynomial.

In further embodiments, however the first time series data may correspond to a first azimuth angle and second time series data may correspond to a second azimuth angle, the first regression filter having a first regression filter length, and second regression filter having a second regression filter length that is less than the first regression filter length. Advantageously, this may help adjust the notch size of the regression filter to account for the ground clutter echo signal found in radar time series data at different azimuth angles due to the radar side lobes. By maintaining a greater first regression filter length for the first azimuth angle, the first regression filter may remove more of the ground echo from data at the main lobe than at the second azimuth angle, which may correspond to a side lobe.

In embodiments, step 210 may be applied again with steps 212-218.

In further embodiments, method 200 may further comprise step 220. In step 220, one or more radar variables may be determined from the regression filtered first time series data. For example, the one or more radar variables may include the total return power, velocity, spectrum width, differential reflectivity, differential phase, or any other radar variable known to those of skill in the art.

Figure 11:
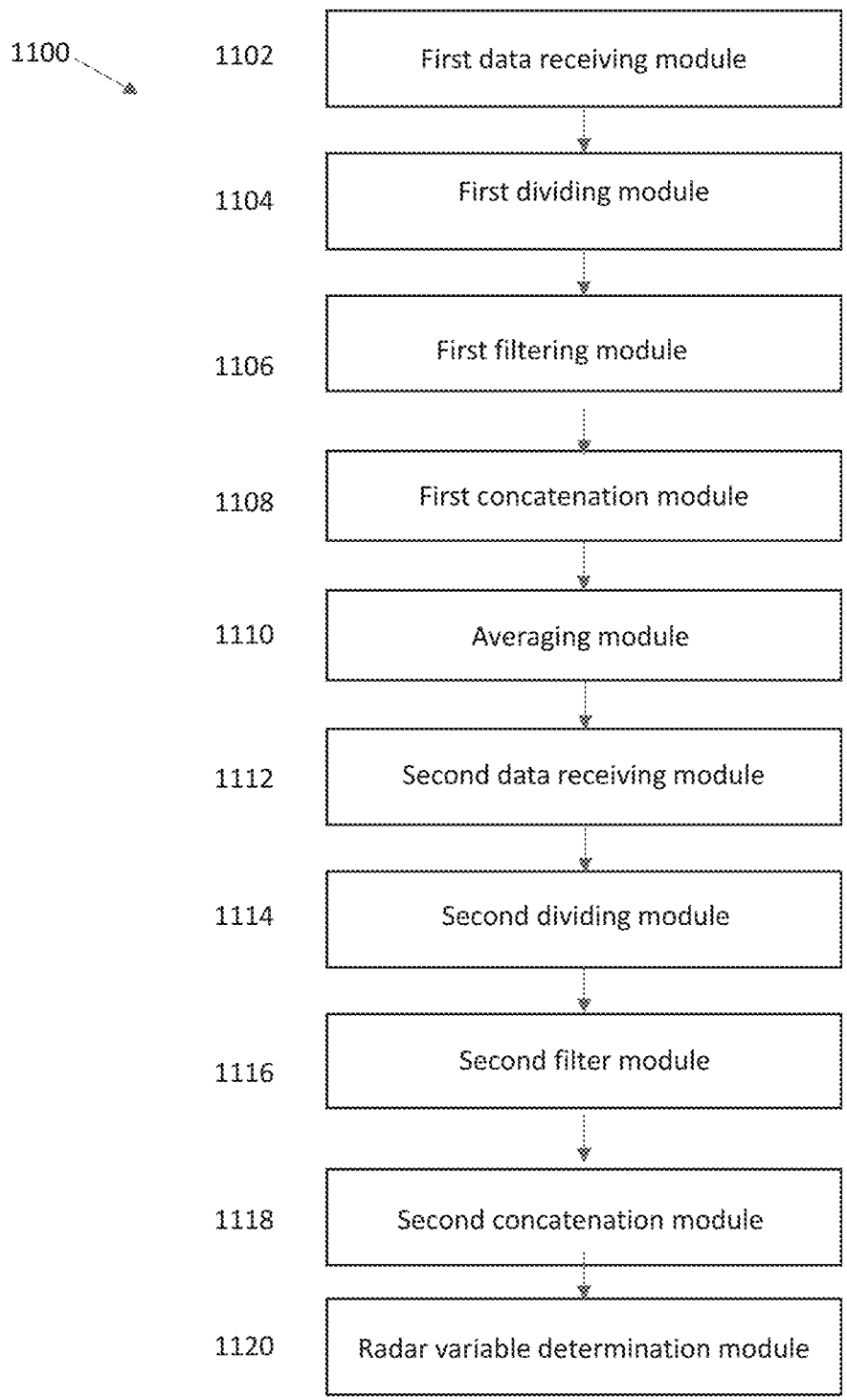
FIG. 11 depicts system 1100, in accordance with an embodiment.

FIG. 11 depicts system 1100, in accordance with a further embodiment. System 1100 may be used to remove ground clutter from radar time series data.

System 1100 includes first data receiving module 1102, first dividing module 1104, first filtering module 1106, and first concatenation module 1108. First data receiving module 1102 may execute step 202. First dividing module 1104 may execute step 204. First filtering module 1106 may execute step 206. First concatenation module 1108 may execute step 208.

In embodiments, system 1100 may further include averaging module 1110, which may execute step 210.

In further embodiments, system 1100 may further include second data receiving module 1112, second dividing module 1114, second filter module 1116, and second concatenation module 1118. Second data receiving module 1112 may execute step 212. Second dividing module 1114 may execute step 214. Second filter module 1116 may execute step 216. Second concatenation module 1118 may execute step 218.

In further embodiments. System 1100 may further include radar variable determination module 1120, which may execute step 220.

System 1100 may further execute any of the variations described above with respect to method 200.

By dividing the time series data into subsets and applying a regression filter to each subset, it may be possible to improve ground clutter filtering performance and signal statistics of the weather echo variables. Dividing the time series data into subsets to apply the regression filter may further allow for the use of lower order polynomials in the regression filter, reducing processor load, and making the regression filter technique computationally viable. Selecting the size of the subsets and the order of polynomial may further allow for further customization of frequency response of the filter, which may be used to account for different levels of ground clutter echo found in radar data at different elevations and azimuth angles.

What is claimed is:

1. A method for removing ground clutter data from time series data, the method comprising:
   receiving first time series data;
   dividing the first time series data into a plurality of subsets of first time series data;
   applying a first regression filter to each respective subset first time series data of the plurality of subsets of first time series data to generate a plurality of regression filtered subsets of first time series data; and
   concatenating the plurality of regression filtered subsets of first time series data to generate a regression filtered first time series data.

2. The method of claim 1, wherein each respective subset of the first time series data of the plurality of subsets of first time series data is a single subset size.

3. The method of claim 1, wherein no two respective subsets of the first time series data of the plurality of subsets of first time series data include a shared time series data point.

4. The method of claim 1, wherein each adjacent pair of subsets of the first time series data of the plurality of subsets of first time series data include at least one shared time series data point that other subsets of the plurality of subsets of the first time series do not include.

5. The method of claim 4, wherein concatenating the plurality of regression filtered subsets of first time series data to generate the regression filtered first time series data further comprises:
   averaging the at least one shared time series data point for each respective regression filtered subset of first time series data for the adjacent pair of subsets of the first time series data to include in the regression filtered first time series data.

6. The method of claim 4, wherein each adjacent pair of subsets of the first time series data of the plurality of subsets of first time series data include a same number of shared time series data points.

7. The method of claim 1, wherein the first time series data corresponds to a first elevation angle, and the method further comprises:
   receiving a second time series data, corresponding to a second elevation angle that is higher than the first elevation angle;
   dividing the second time series data into a plurality of subsets of second time series data;
   applying a second regression filter to each respective subset second time series data of the plurality of subsets of second time series data to generate a plurality of regression filtered subsets of second time series data;
   concatenating the plurality of regression filtered subsets of first time series data to generate a regression filtered second time series data,
   wherein the first regression filter has a first regression filter length, and the second regression filter has a second regression filter length, the first regression filter length being larger than the second regression filter length.

8. The method of claim 1, wherein the first time series data corresponds to a first azimuth angle, and the method further comprises:
   receiving a second time series data, corresponding to a second azimuth angle that is different from the first azimuth angle;
   dividing the second time series data into a plurality of subsets of second time series data;
   applying a second regression filter to each respective subset second time series data of the plurality of subsets of second time series data to generate a plurality of regression filtered subsets of second time series data;
   concatenating the plurality of regression filtered subsets of first time series data to generate a regression filtered second time series data,
   wherein the first regression filter has a first regression filter length, and the second regression filter has a second regression filter length, the first regression filter length being larger than the second regression filter length.

9. The method of claim 1, further comprising:
   determining one or more radar variables from the regression filtered first time series data.

10. A system for removing ground clutter data from time series data, the system comprising:
    a first data receiving module operable to receive first time series data;
    a first dividing module operable to divide the first time series data into a plurality of subsets of first time series data;
    a first filtering module operable to apply a first regression filter to each respective subset first time series data of the plurality of subsets of first time series data to generate a plurality of regression filtered subsets of first time series data; and a first concatenation module operable to concatenate the plurality of regression filtered subsets of first time series data to generate a regression filtered first time series data.

11. The system of claim 10, wherein each respective subset of the first time series data of the plurality of subsets of first time series data is a single subset size.

12. The system of claim 10, wherein no two respective subsets of the first time series data of the plurality of subsets of first time series data include a shared time series data point.

13. The system of claim 10, wherein each adjacent pair of subsets of the first time series data of the plurality of subsets of first time series data include at least one shared time series data point.

14. The system of claim 13, the system further comprises: an averaging module configured to average the at least one shared time series data point for each respective regression filtered subset of first time series data for each subset of the pair of subsets of the first time series data to include in the regression filtered first time series data.

15. The system of claim 13, wherein each adjacent pair of subsets of the first time series data of the plurality of subsets of first time series data include a same number of shared time series data points.

16. The system of claim 10, wherein the first time series data corresponds to a first elevation angle, and the system further comprises:
a second data receiving module configured to receive a second time series data, corresponding to a second elevation angle that is higher than the first elevation angle;
a second dividing module configured to divide the second time series data into a plurality of subsets of second time series data;
a second filter module configured to apply a second regression filter to each respective subset second time series data of the plurality of subsets of second time series data to generate a plurality of regression filtered subsets of second time series data;
a second concatenation module configured to concatenate the plurality of regression filtered subsets of first time series data to generate a regression filtered second time series data,
wherein the first regression filter has a first regression filter length, and the second regression filter has a second regression filter length, the first regression filter length being larger than the second regression filter length.

17. The system of claim 10, wherein the first time series data corresponds to a first azimuth angle, and the system further comprises:
a second data receiving module configured to receive a second time series data, corresponding to a second azimuth angle that does not overlap the first range of azimuth angles;
a second dividing module configured to divide the second time series data into a plurality of subsets of second time series data;
a second filter module configured to apply a second regression filter to each respective subset second time series data of the plurality of subsets of second time series data to generate a plurality of regression filtered subsets of second time series data;
a second concatenation module configured to concatenate the plurality of regression filtered subsets of first time series data to generate a regression filtered second time series data,
wherein the first regression filter has a first regression filter length, and the second regression filter has a second regression filter length, the first regression filter length being larger than the second regression filter length.

18. The system of claim 10, further comprising:
a radar variable determination module configured to determine one or more radar variables from regression filtered first time series data.

* * * * *